Figure 4:
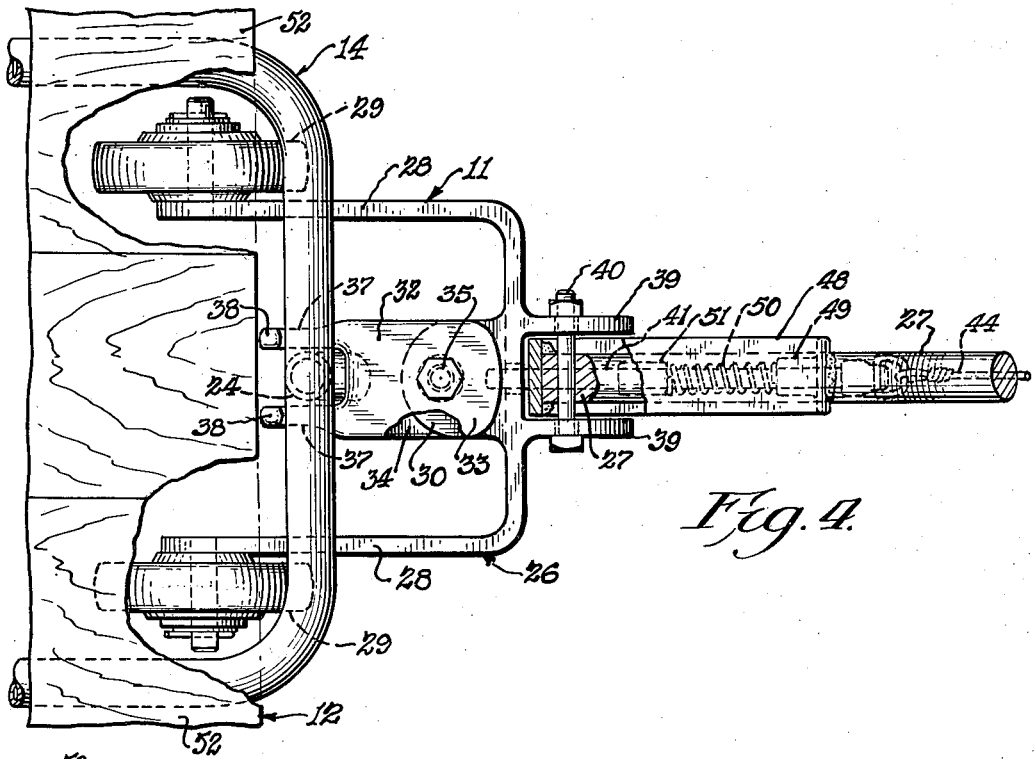

June 14, 1949.  J. SKIPPER ET AL  2,472,989
PORTABLE TRUCK
Filed May 2, 1946  3 Sheets-Sheet 1
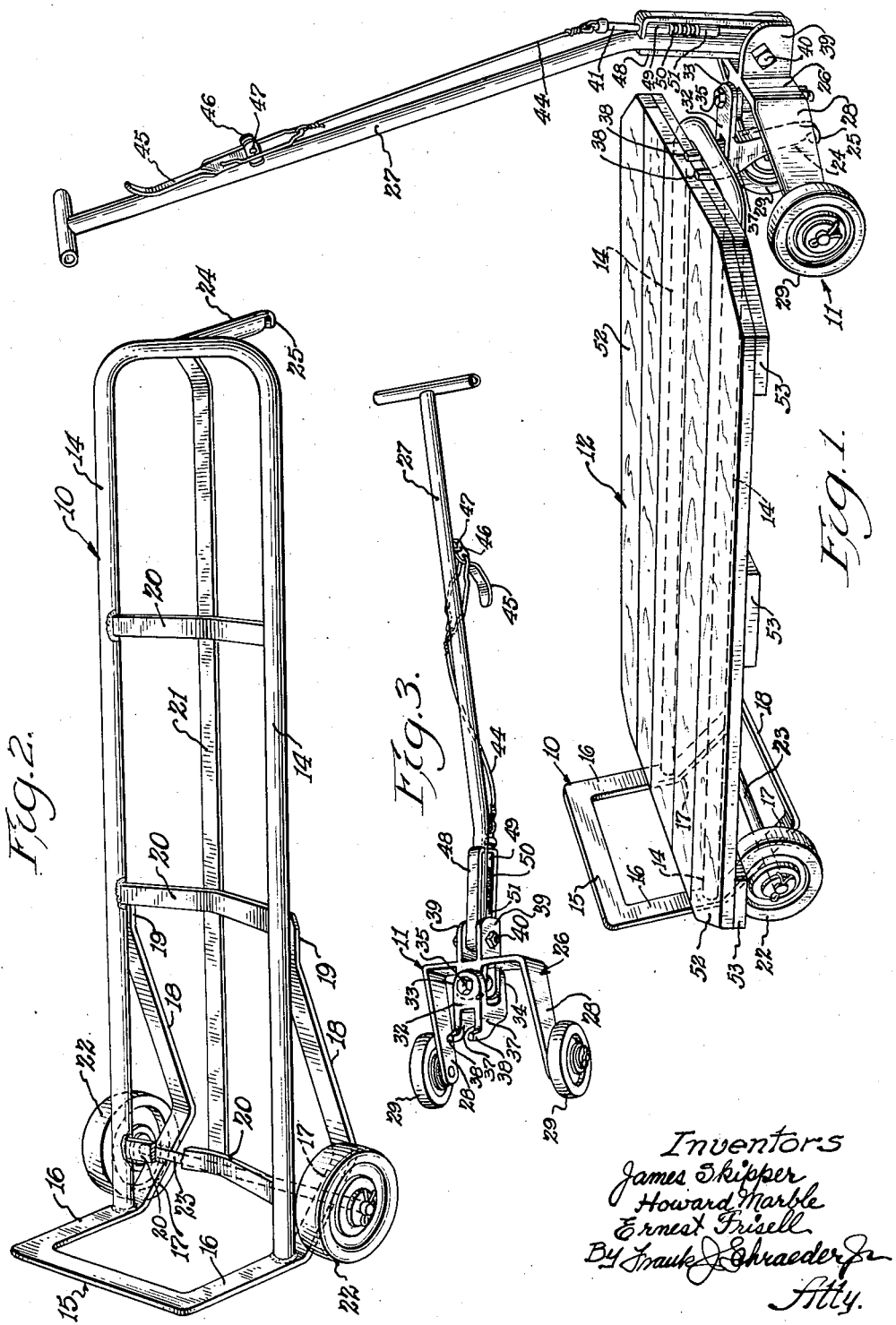

Inventors
James Skipper
Howard Marble
Ernest Frisell

By Frank J. Schraeder Atty.

June 14, 1949.  J. SKIPPER ET AL  2,472,989
PORTABLE TRUCK
Filed May 2, 1946  3 Sheets-Sheet 3
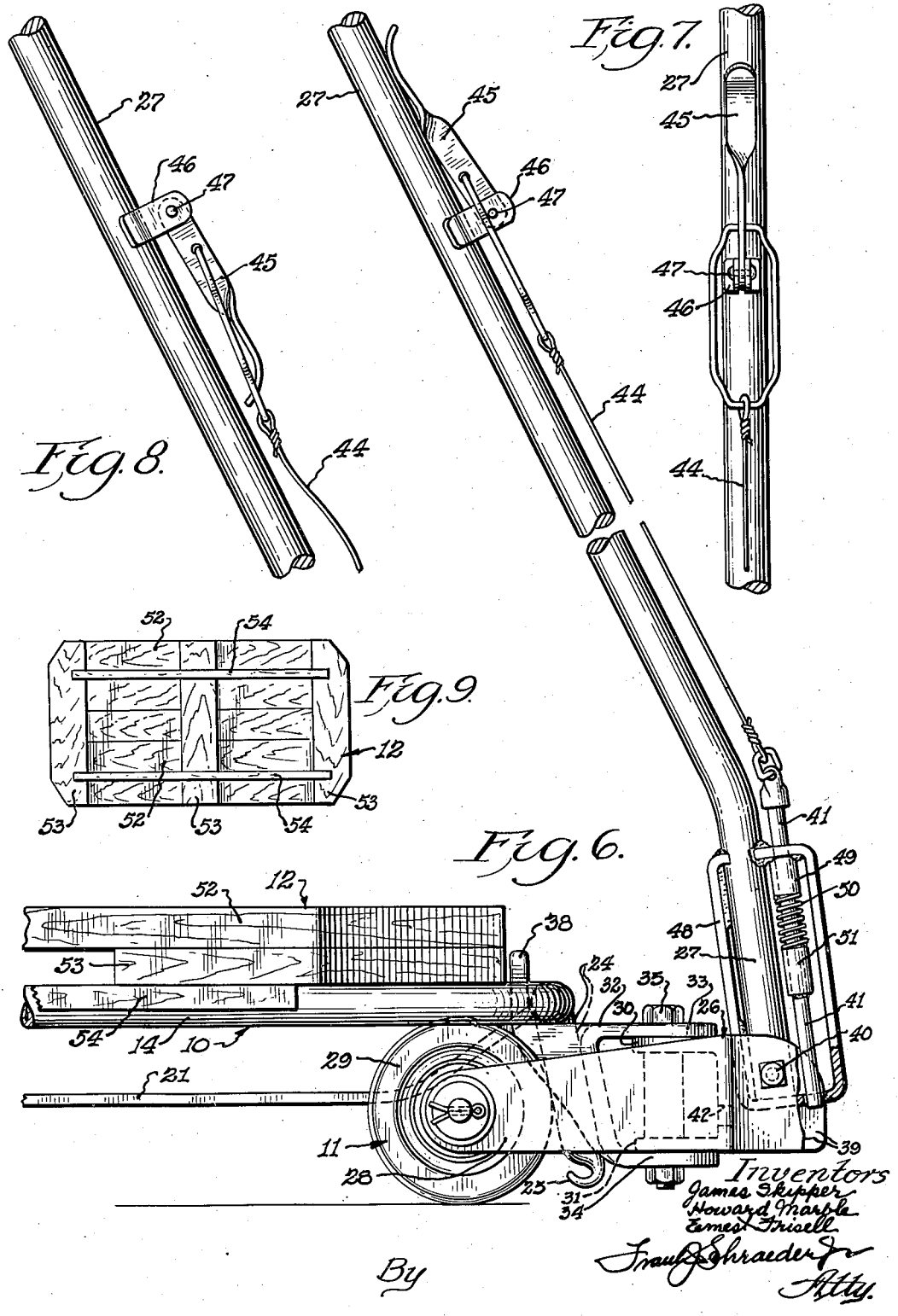

Patented June 14, 1949

2,472,989

UNITED STATES PATENT OFFICE 2,472,989

PORTABLE TRUCK

James Skipper, Howard Marble, and
Ernest Frisell, Omaha, Nebr.

Application May 2, 1946, Serial No. 666,753

6 Claims. (Cl. 280—46)

In many factories and other places it is customary to employ two types of small trucks, each for a different purpose, although a substantial portion of each group may frequently be idle at the same time and a substantial number of one type or the other may be idle at all times; one of the types being the conventional hand truck having two wheels at one end and a handle or handles at the other end, while the other type is one having a horizontal bed or platform supported by wheels at both ends.

The present invention has for its main object to produce a construction which makes it possible to convert a simple two-wheeled hand truck into a truck having a horizontal bed supported on wheels at both ends.

In carrying out the present invention, a two-wheeled hand truck is provided at the handle end with an auxiliary member that functions as an auxiliary handle and as a leg that does not interfere with the use of the truck in the conventional manner, but permits the body to be supported in a substantially horizontal position for loading in the same way that a conventional four wheel truck or platform is loaded. Arranged for cooperation with this hand truck is a small, wheeled carriage provided with a handle and adapted to be introduced under the handle end of the truck to transfer the load from the said leg to the carriage and lift the leg clear of the floor so that both ends of the truck are provided with rolling supports and the truck may be drawn by the handle on the carriage.

Another object of the present invention may therefore be said to be the production of a simple and novel manually propellable wheeled carriage that easily may be engaged with the handle end of a horizontally placed two wheeled hand truck to move the truck to any desired destination and then be just as easily disconnected from the truck for use with other similar hand trucks.

Considerable power is required to lift the handle end of a loaded truck which is in a horizontal position at the time the carriage is placed under the same. One of the objects of the present invention is to provide the aforesaid carriage with a long handle that may swing up and down or be permitted to stand upright in a conventional manner during ordinary use, but which may be caused to act as a rigid lever arm projecting from the carriage for the purpose of connecting the carriage to or disconnecting it from the truck.

A still further object of the present invention is to produce a hand truck unit, having wheels at one end only, and a unit cooperating therewith to provide a wheeled support for the other end of the truck, which may be assembled and taken apart by simply moving the units relatively to each other.

In developing the composite truck as a whole, certain new and valuable features in the two-wheeled hand truck have been created, so that further objects of the invention may be said to reside in the improvements of two-wheeled hand trucks, as well as the provision of means to make easier the movements of such a truck over stairs from one level to another.

Figure 5:
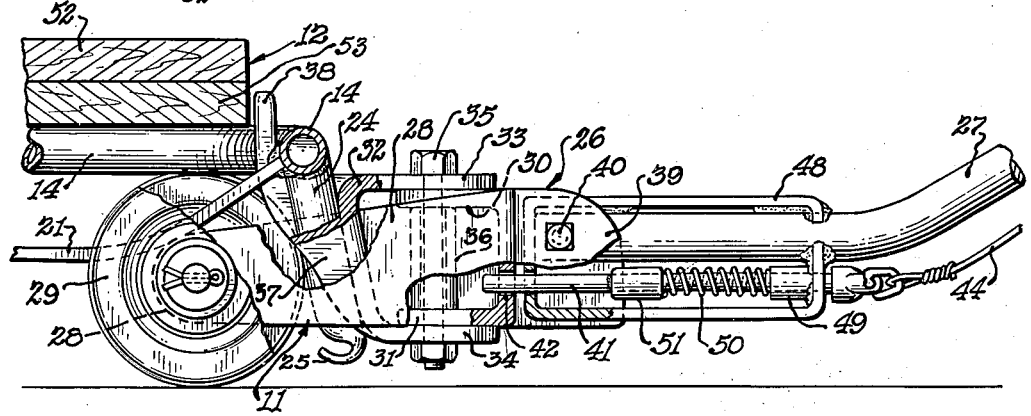

The various features of novelty whereby the present invention is characterized will hereinafter be pointed out with particularity in the claims; but, for a full understanding of the invention and of the aforesaid and further objects and advantages, reference may be had to the following detailed description taken in connection with the accompanying drawings, wherein:

Figure 1 is a perspective view of a composite truck embodying the present invention in a preferred form; Fig. 2 is a perspective view, on a larger scale, of the two wheeled hand truck unit or member of the composite truck of Fig. 1; Fig. 3 is a perspective view of the wheeled carriage unit or member, the scale being smaller than in Fig. 1; Fig. 4 is a top plan view, with the handle down and parts broken away to expose other parts, showing on a much larger scale the right hand end of the composite truck; Fig. 5 is a side view of so much of the structure as appears in Fig. 4, parts being broken away to expose elements that would otherwise be hidden; Fig. 6 is a view similar to Fig. 5, with the handle raised and being more nearly a complete elevational view than Fig. 5; Fig. 7 is a view looking at the upper part of the raised handle from a point to the right of Fig. 6; Fig. 8 is a view, similar to Fig. 6, showing only a fragment of the handle, the latch or bolt operating lever being down instead of up; and Fig. 9 is a bottom plan view of the detachable bed or platform member of the composite truck.

Referring to the drawings, 10 indicates the more or less conventional hand truck shown in Fig. 2; 11 is the wheeled carriage or the auxiliary truck shown in Fig. 3; and 12, shown in Fig. 9, is the detachable bed; all of which may be assembled to form the composite truck of Fig. 1, without the use of bolts or other extraneous fastening means.

The body or frame of truck 10 is preferably constructed of a piece of pipe or heavy tubing bent into an elongated U, 14, and bar or heavy strap-like members extending crosswise and lengthwise of the U. The most important of such members is a part 15 which is also an elongated U as wide as the tubular member. Each leg of member 15 is bent at three points along parallel lines in the original plane of the U, the two bends nearest the closed end being in the same direction and the third, near the free end of the leg, being in the opposite direction. Each leg therefore comprises four sections, 16, 17, 18 and 19, inclined relatively to each other. The free ends of the tube constituting the member 14, abut against sections 16 of member 15, close to the bends between the same and sections 17, and are welded thereto. Sections 19 lie against the under sides of the tubular legs of member 14 and are welded thereto. Sections 18 are preferably considerably longer than sections 17 so as to constitute fairly long inclined skids or shoes directly under the tubular longitudinal elements of the frame. The closed end of U-shaped member 15, including the cross piece thereof and the two leg sections 16, lies above the plane of frame member 14 and constitutes the scoop-like front wall or panel usual in conventional two-wheeled hand trucks. The leg of member 14 are preferably connected together, at intervals by cross straps 29, welded at their ends to such legs and sagging somewhat in the middle. There is also, preferably, a central, longitudinal strap 21 welded to all of the cross straps and bent up and welded at the rear end to the cross strap 20 of tubular frame member 14.

The forward end of truck 10 is supported on two wheels 22 carried on the ends of an axle 23. This axle spans the width of the truck below frame member 14 and overlies and is welded to sections 17 of member 15, about midway between the ends of such sections. The axle therefore serves also as a cross brace for the frame structure. The wheels extend only a short distance below the lowest points of the skids which start to incline upward and backward from about a vertical plane tangent to the wheels. At the rear or handle end of the truck is a leg 24 in the form of a short piece of pipe or tubing welded at its upper end to the middle of the cross piece or handle section of the tubular frame member 14. The lower end of this piece of pipe is collapsed and then bent forward, as indicated at 25, to provide a smooth, rounded foot adapted to rest on a floor or other flat supporting surface when the handle end of the truck is lowered as shown in Fig. 2.

The truck thus described in detail may be used in the same way as any conventional two wheeled hand truck, the tubular cross piece of frame 14, at the closed end of the U, serving as a handle bar; but it can be left standing with its main frame substantially horizontal, because of the supporting leg 24; and, furthermore, the skids may act as the runners of a sled, when, for example, the truck whether empty or loaded, is being lowered down a flight of steps. So far as the last characteristic is concerned, it will be seen that because the wheels do not project very far below the near ends of the skids, the skids may rest crosswise of the edge of a step while the wheels are held clear of the next lower step. With the truck in this position, it can slide down from one step to another without using the wheels at all. A further useful characteristic of this truck is that, because of the sagging cross straps, a barrel or the like is cradled thereon in such a way that it cannot accidentally roll off sidewise.

The auxiliary truck 11, adapted to cooperate with the large truck to produce a vehicle having a rolling support at both ends, consists simply of a little wheeled carriage 26 provided with a long handle 27. The carriage comprises a sturdy, horizontal, U-shaped frame member 28, on the free ends of the arms of which are wheels 29 about an inch smaller in diameter than the wheels 22. The cross piece or transverse portion of the U-shaped frame has two horizontal ears, 30 and 31, one at the top and the other at the bottom, on the same side as the arms and midway between them. Supported by these ears is a coupling device in the form of a casting 32 provided with horizontal ears 33 and 34, one of which lies on top of ear 30 while the other lies underneath and close to ear 31. A pivot bolt 35 extends down through all four ears and serves as a pivot about which the U-shaped frame 28 may swing or turn relatively to the coupling device. There may also be present a sleeve 36 surrounding the bolt and fitting between ears 30 and 31 as a stiffener or spacer. On what may be termed the front end of the coupling device is a forked extension comprising a pair of transversely spaced forwardly projecting vertical forked portions 37. These forked portions are spaced apart far enough to receive between them the leg 24 on the tubular frame member of truck 10, when the cross piece or handle portion of that member rests on the upper edges of the spaced forked portions. At the front end of each fork portion is an upwardly projecting finger 38 considerably longer than the diameter of the tubular member 14 in the frame of truck 10. The parts are so proportioned that when the carriage is moved up to the handle end of truck 10, as the latter stands in Fig. 2, while in a more or less upright position that causes the fork-like fingers 38 to point forward while also more or less horizontal, the fingers straddle the leg 24 and, upon swinging the rear or outer end of the carriage down, the fork fingers rise up in front of the tubular cross piece or handle bar on truck 10; the rear end of truck 10 being lifted to raise the leg 24 off the floor, as best shown in Figs. 5 and 6. Furthermore, as shown in these last named figures, the front end of the coupling device 32, between the forked portions 37 thereon, is shaped to lie snugly against leg 24 throughout substantially the entire length of the latter as soon as the weight of the rear end of truck 10 is imposed on the auxiliary truck. The forked elements 37 embrace the leg 24 on three sides thereof while the fingers 38 engage the inner side of the transverse portion of the U-shaped hand truck handle. Thus the coupling device 32 becomes, in effect, a fixed attachment to the tubular frame and furnishes the latter with a swivel connection with the wheeled carriage of the auxiliary truck.

The auxiliary truck is provided with any suitable handle, preferably a long one that can be swung up out of the way or be caused to extend rearwardly in the manner of the handle of any conventional truck that has a hinged handle. In the arrangement shown, the frame member 28 of the auxiliary truck has two parallel, spaced, vertical ears 39 projecting rearwardly therefrom at the middle of the rear end. Handle 27 extends at one end between these ears and is hingedly connected thereto by a bolt 40 that passes horizontally through the handle and both ears. Therefore the handle can be swung up as it appears in Figs. 1 and 6 or down, as in Figs. 3, 4 and 5.

It is desirable that means be provided to lock the handle of the auxiliary truck to the frame or body thereof, to facilitate the insertion of this truck under the handle end of the main truck, and its subsequent removal from beneath the latter. In the arrangement shown, the handle 27 carries on the under side thereof a spring-pressed locking bolt or pin 41, one end of which is adapted to enter a hole 42 in the cross bar of U-shaped frame 28 when the handle is lowered, and the bolt or pin is in a horizontal position, as shown in Figs. 4 and 5. A wire 44, or other suitable member, preferably flexible, is fastened at one end to the outer end of the said bolt or pin and extends along the handle to a small lever 45. This lever is hinged at one end to a little bracket 46 on the under side and near the free end of the handle. The connection between the wire and the lever is located a short distance from the hinge axis of the latter. Therefore, when the lever is swung up so as to lie against the handle beyond the bracket, as shown in Fig. 6, it pulls the wire lengthwise and withdraws the locking bolt from hole 42 into its release position, so that the handle may be swung up and down freely and be left in an approximately upright position, if desired. When the lever is swung from the position it occupies in Fig. 6 to that in Fig. 8, the wire is left slack and, when the handle is lowered into the position in which it is shown in Fig. 5, the bolt or pin snaps into hole 42 and locks the handle against movements relatively to the body of the auxiliary truck. The hinge pin 47 for lever 45 is preferably spaced far enough away from the handle to cause the wire to lie between the same and the handle when the lever is swung into the lock releasing position; the pull of the spring that actuates the locking bolt thus holding the free end of the lever tightly against the handle and preventing it from accidently swinging into the position that allows a movement of the bolt into its locking position relative to the handle.

The locking bolt may be mounted in any suitable way on the handle. In the arrangement shown, the handle is a piece of pipe or tubing the hinged end of which is embraced by a rectangular frame 48 composed of a heavy strap bent so that one short side of the frame engages and extends crosswise of the end of the handle, the long members of the frame lie on opposite sides of and lengthwise of the handle, and the other short frame member comprises two pieces arranged on opposite sides of and radially of the handle; the handle being welded to the said two radial pieces and to the frame member crossing the end of the handle. The width of the frame 48 is considerably greater than the diameter of the handle so that, by placing the handle close to one of the long members of the frame, to which it may advantageously be welded, a space is left with the frame below the handle proper for the bolt 41. The bolt 41 is made longer than the frame 48 so that it may extend through and have bearings in both short end sections of the latter. In order to provide at the outer end of the bolt a bearing longer than the thickness of the strap or bar material of which its supporting frame is composed, a sleeve 49, surrounding the bolt, is welded to the corresponding member of the frame. A compression spring 50 surrounds the bolt, abutting at one end against sleeve 49 and at the other end against a sleeve or collar 51 that is welded or otherwise secured to the bolt. When not restrained by the wire 44 from doing so, spring 50 forces the bolt in the direction to lock the handle whenever the latter is in a lowered position.

Although the more or less conventional truck 10 and the composite truck, of which it may form a part, may be used without any other load-supporting means than are afforded by the frame structure of truck 10, any suitable bed or platform may be placed on top of the tubular frame of truck 10 when desired; platform 12, referred to heretofore, being a simple form adapted for this purpose.

Platform 12 is composed of longitudinal boards 52 and cross pieces 53 and is slightly shorter than the main tubular U-shaped frame 14, so that it may be laid on this frame and leave a space between the handle bar member of that frame and the adjacent end of the platform. When the platform is used on the composite truck, the fingers 38 on the small auxiliary truck project up through this space, as best shown in Figs. 5 and 6, and serve as stops to prevent the platform from sliding backward. To prevent the platform from slipping off sidewise, a pair of longitudinal cleats 54, shown in Figs. 6 and 10, are applied over the cross pieces 53; these cleats being spaced apart a distance equal to the width of the tubular frame member of truck 10. Therefore, when the platform is placed on the truck, the cleats 54 lie outside of the longitudinal tubular frame elements and hold the platform against sidewise movement unless the platform is first lifted high enough to carry the cleats clear of these frame elements.

It has already been explained that truck 10 may be used in the same way as any conventional two-wheeled truck and that the composite truck, with or without the additional bed or platform, may be used as any conventional truck having wheels at both ends and a low horizontal load supporting bed. While a user may provide himself with as many auxiliary trucks as two-wheeled hand trucks, the greatest saving is attained where a number of four-wheeled trucks can be loaded and be picked up, one after another, and be rolled away with the aid of a single auxiliary truck. In other words, many situations arise wherein a truck corresponding to the composite truck herein disclosed is loaded very slowly and needs to be removed and emptied only after fairly long loading periods. In such case, only an inexpensive two-wheeled hand truck, standing in a horizontal position, as in Fig. 2, is kept from doing other useful work during these waiting periods; because, with a single auxiliary truck, a workman can quickly convert one two-wheeled truck into a four-wheeled truck, haul it away, leave it to be unloaded, and then pick up others, one after another, and proceed in the same way with each of them. In such situations, even though more two-wheeled hand trucks are employed than are needed in lieu of conventional trucks of that kind, the cost of the same and of one or a few of the auxiliary trucks is substantially less than would be the cost of all of the conventional two-wheeled and four-wheeled trucks required to do the same work.

While there has been illustrated and described with particularity only a single preferred form of the present invention, it is not desired to limit the invention to the specific details thus illustrated and described; but it is intended to cover all forms and arrangements coming within the definitions of the invention constituting the appended claims.

We claim:

1. In combination, a hand truck having a body member provided at the front end with a rolling supporting means and at the rear end with a cross bar having a foot piece to rest on the floor when the body member is lowered so as to be approximately parallel to the floor, and an auxiliary truck adapted to be inserted under said cross bar and raise it far enough to lift the foot piece from the floor, the auxiliary truck having thereon elements that extend forward on opposite sides of the foot piece and up in front of said bar.

2. In combination, a hand truck having a body member provided at the front end with a rolling supporting means and at the rear end with handle means, a low auxiliary truck having spaced arms adapted to be inserted below the rear end of said body member, wheels on the front ends of said arms; and means including, as the immediate support for the truck body, a member on the auxiliary truck swivelled to turn about a vertical axis and interlocked with the said body member to hold the two trucks together.

3. An apparatus as set forth in claim 2, wherein the interlocking means between the trucks includes a part that projects down from the body member of the hand truck when the same is horizontal and serves as a support for the rear end of said body member until the auxiliary truck is connected to the hand truck.

4. In combination, a hand truck comprising a U-shaped tubular body member having at its free ends wheels and its transverse body portion constituting a handle bar, a single foot piece extending downwardly from the medial portion of said handle bar adapted to rest on a floor to support the body member in a very slightly rearwardly sloping position which for practical load-supporting purposes is substantially horizontal, and an auxiliary two-wheeled carriage provided with a handle bar and a coupling device adapted to be coupled directly with said handle bar and foot piece between opposed portions of said coupling device to thereby raise the handle end of said hand truck member and said foot piece to cause the load on said hand truck to be borne by its wheels and those of the carriage when the coupled truck and carriage are moved by the carriage handle.

5. Apparatus as set forth in claim 4 wherein said two-wheeled carriage coupling device comprises a U-shaped frame having longitudinally extending spaced portions the free ends of which carry the two wheels of the carriage and a transverse portion formed integrally with said longitudinally spaced portions, said handle for said carriage being pivotally connected with said transverse portion, and said coupling device also being pivotally connected with said transverse portion and having a forked extension adapted to be interposed about three sides of said foot piece with the ends of the forked portion thereof extending against the inner side of the transverse handle bar portion of the hand truck to thereby couple said wheeled carriage in an interlocked manner with said hand truck.

6. In combination, a hand truck comprising a U-shaped body member supported at its spaced ends on rolling supporting means and at its opposite end terminating in a transversely disposed handle bar constituting the closed end of said U-shaped body, a single leg depending from said transverse handle bar adapted to rest on a floor to support said body member in a more or less horizontal position, and an auxiliary wheeled truck carrying a coupling provided with a handle and a pair of upwardly projecting laterally spaced fingers, said coupling being adapted to be positioned by its said handle beneath said truck handle bar whereby said fingers simultaneously engage between them opposite sides of said leg and the inner side of said handle bar to thereby couple said coupling with said truck and raise same high enough to cause said leg to be clear of the floor.

JAMES SKIPPER.
HOWARD MARBLE.
ERNEST FRISELL.

REFERENCES CITED

The following references are of record in the file of this patent:

UNITED STATES PATENTS

| Number | Name | Date |
|---|---|---|
| 385,181 | Huntly | June 26, 1888 |
| 801,123 | Wheeler | Oct. 3, 1905 |
| 1,234,667 | Howe et al. | July 24, 1917 |
| 1,300,567 | Brorby | Apr. 15, 1919 |
| 1,434,572 | Turner | Nov. 7, 1922 |
| 1,728,839 | Staley | Sept. 17, 1929 |
| 1,916,850 | Pehrsson | July 4, 1933 |
| 2,147,764 | Brown | Feb. 21, 1939 |
| 2,263,879 | Jorgensen | Nov. 25, 1941 |

FOREIGN PATENTS

| Number | Country | Date |
|---|---|---|
| 475,746 | Great Britain | Nov. 25, 1937 |